United States Patent [19]

Ebert et al.

[11] Patent Number: 4,702,513
[45] Date of Patent: Oct. 27, 1987

[54] BRACKET FOR SUN VISOR FOR AUTOMOTIVE VEHICLES WITH MEANS FOR EXCLUDING MOLDING FOAM

[75] Inventors: Charles Ebert; Jean L. Delcroix, Luxeuil; Roland Majchrzak, Yutz, all of France; Lothar Viertel, Berus Uberherrn, Fed. Rep. of Germany

[73] Assignee: Gebr. Happich GmbH, Fed. Rep. of Germany

[21] Appl. No.: 745,852

[22] Filed: Jun. 17, 1985

[30] Foreign Application Priority Data

Nov. 9, 1984 [DE] Fed. Rep. of Germany ....... 3440976

[51] Int. Cl.$^4$ ............................................... B60J 3/02
[52] U.S. Cl. ................................. 296/97 H; 296/97 K
[58] Field of Search .................. 296/97 R, 97 B, 97 C, 296/97 H, 97 J, 97 K

[56] References Cited

U.S. PATENT DOCUMENTS

| 3,669,501 | 6/1972 | Derleth ......................... 301/63 R X |
| 4,394,043 | 7/1983 | Moulding et al. ................. 296/97 H |

FOREIGN PATENT DOCUMENTS

| 0034215 | 8/1981 | European Pat. Off. .......... 296/97 C |
| 0053529 | 6/1982 | European Pat. Off. .......... 296/97 C |
| 0143408 | 6/1985 | European Pat. Off. .......... 296/97 R |
| 1259725 | 1/1968 | Fed. Rep. of Germany ... 296/97 K |
| 2234921 | 1/1974 | Fed. Rep. of Germany ... 296/97 K |
| 2448280 | 4/1976 | Fed. Rep. of Germany ... 296/97 K |
| 2730926 | 1/1979 | Fed. Rep. of Germany ... 296/97 H |
| 0140222 | 8/1982 | Japan .............................. 296/97 H |
| 0063518 | 4/1983 | Japan .............................. 296/97 H |
| 1452220 | 10/1976 | United Kingdom ............. 296/97 H |
| 2061210 | 5/1981 | United Kingdom ............. 296/97 H |

Primary Examiner—Robert B. Reeves
Assistant Examiner—Russell D. Stormer
Attorney, Agent, or Firm—Ostrolenk, Faber, Gerb & Soffen

[57] ABSTRACT

A sun visor for automotive vehicles having a flat, generally rectangular, sun-visor body on which is provided in one corner a mounting bracket. The bracket may be formed by plastic injection molding and includes a mounting borehole for receiving one end region of a sun-visor shaft. The bracket supports a U-shaped leaf spring located in the borehole which radially clamps the end region of the sun-visor shaft. The arms of the spring are placed in recesses which are formed in the wall of the mounting borehole. The leaf spring is located within an insertion opening which is defined at one end of the mounting borehole. The insertion opening and the leaf spring located there are enclosed by a closure element.

14 Claims, 11 Drawing Figures

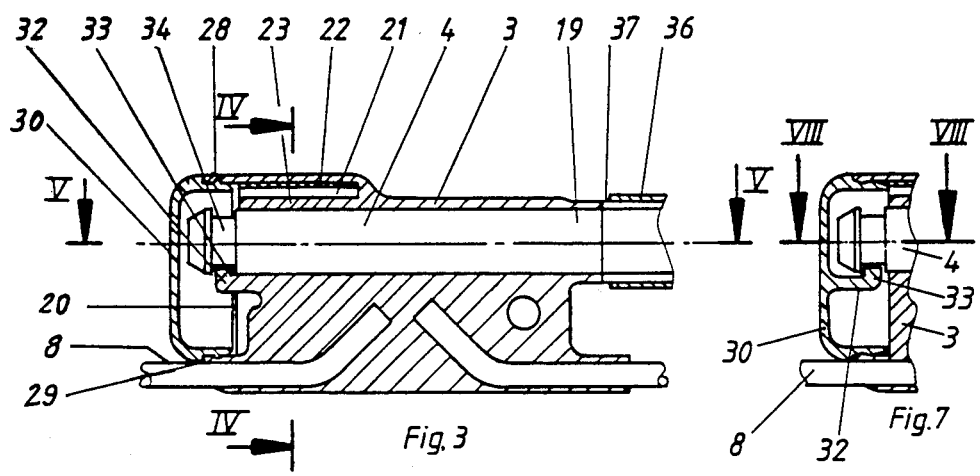
Fig. 3
Fig. 7
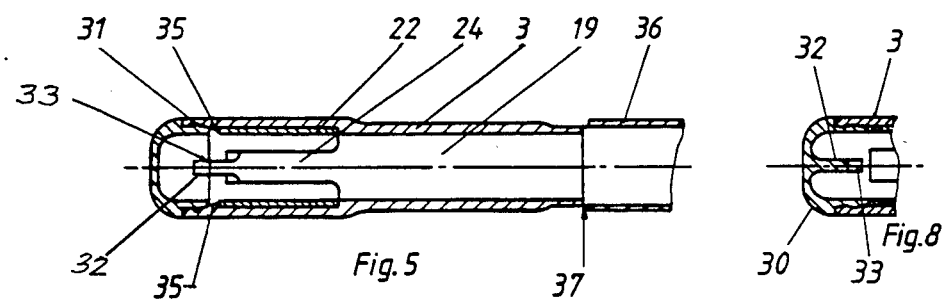
Fig. 5
Fig. 8
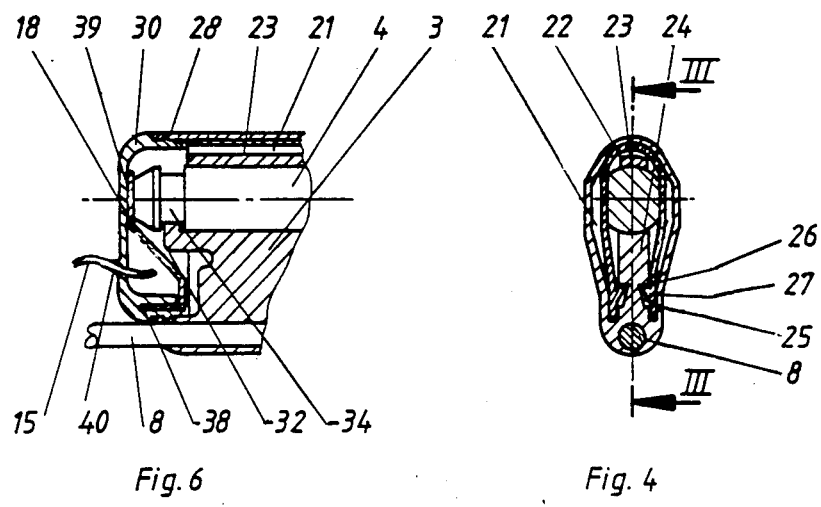
Fig. 6
Fig. 4

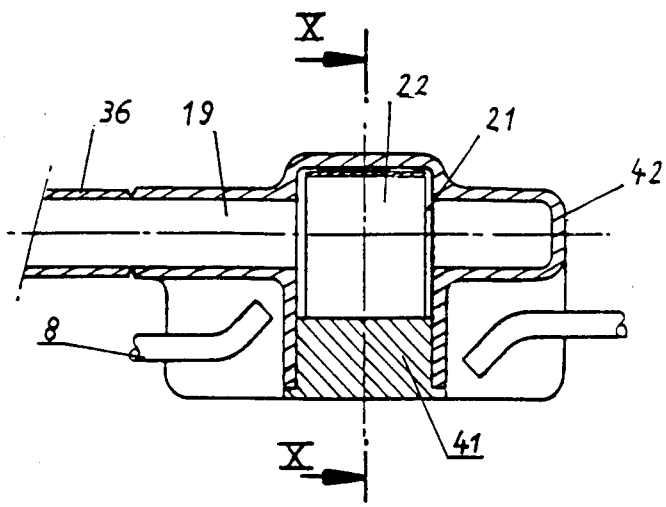
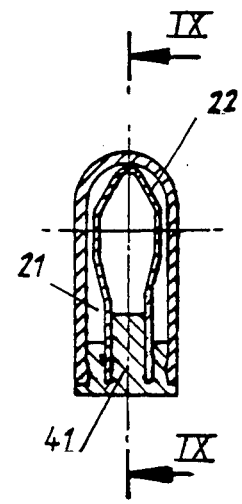
Fig. 9    Fig. 10
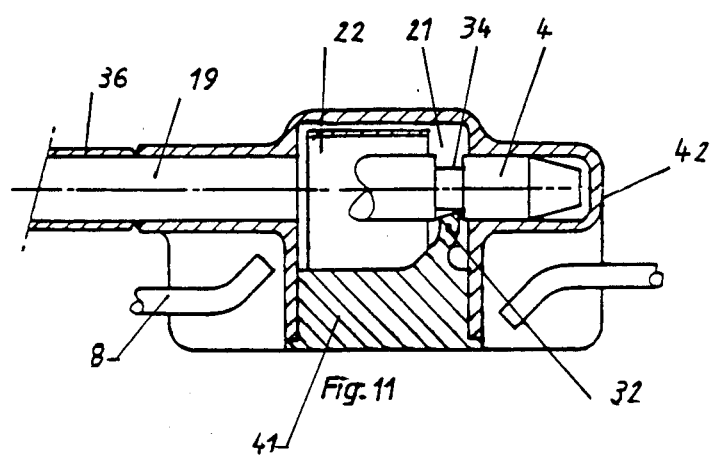
Fig. 11

BRACKET FOR SUN VISOR FOR AUTOMOTIVE VEHICLES WITH MEANS FOR EXCLUDING MOLDING FOAM

BACKGROUND OF THE INVENTION

The present invention relates to a sun visor for automotive vehicles. The visor has a flat, generally rectangular, sun-visor body in one corner region of which is incorporated a mounting bracket. The bracket is developed as a plastic injection molding. A mounting borehole extends through the bracket which receives an end region of a sun-visor shaft and a U-shaped leaf spring which radially clamps the end region of the sun-visor shaft. The leaf spring has a pair of arms which are supported in recesses formed in the wall of the mounting borehole.

Conventional sun visor bodies are reinforced in an insert, in the form of a wire frame, which typically extends generally around the peripheral edges of the sun-visor body. The mounting bracket is supported on the wire frame adjacent one corner thereof. The mounting bracket can be fabricated of sheet metal and may be riveted to the wire frame, or else it may comprise a plastic body which is clipped onto the wire frame. It is also possible to form the bracket directly on the wire frame by injection molding.

In conventional sun visor bodies, the unit comprising the wire frame and sun-visor body are surrounded in a cushioning material, foam or the like, for defining the visor body which, in turn, is covered by a foil layer. Cut foam or molded foam can be used as the cushioning material. Cut foam includes pieces cut from webs of plastic foam which are placed on both sides of the reinforcing insert and of the mounting bracket which is held together by the cover foil, having edges which are selaed together.

Molded foam sun visor bodies are formed by placing the reinforcing insert and the mounting bracket in a foaming mold and then foaming plastic material around them. The molded foam sun-visor body is completed with the provision of the cover foil around it.

In producing foam molded sun visor bodies, major problems are encountered in the region of the mounting bracket because it is difficult, due to the foaming pressure, to prevent foam from entering the borehole and the spring receiving recesses of the bracket. Although it is possible to employ adhesive tape, or the like, for covering the openings into the bracket, this is an unsatisfactory long-term solution since the adhesive tape method is time consuming and labor intensive and, in addition, is not particularly dependable.

SUMMARY OF THE INVENTION

It is an object of the invention to provide an improved sun visor with a mounting bracket structure which avoids the problem of foam penetration into the shaft and spring insertion openings.

It is a further object of the invention to provide a sun-visor body which is simple in construction and economical to produce.

To achieve the foregoing and other objects of the present invention the leaf spring is arranged within an insertion opening formed in the mounting bracket and the insertion opening is covered by a closure element.

The covering of the insertion opening according to the invention hermetically encapsulates the leaf spring and the entire inner space of the mounting bracket. The other front opening into the mounting bore-hole can easily be closed through other means. The cost to manufacture and assemble the closure element is small, particularly with the use of plastic injection molding. Therefore, the mounting bracket according to the invention can be used, as calculations have shown, as a standard part for use in sun visor bodies formed of cut foam.

A preferred embodiment of the invention provides a mounting bracket which has at one end an insertion opening for the spring. The opening is accessible only from the front end of the housing and extends coaxially with the borehole of the mounting. A cap serves as the closure element. It tightly closes the borehole of the mounting bracket and its insertion opening.

In accordance with another preferred embodiment of the invention, the cap is cup shaped and is provided on its inner wall with a circumferential bead which engages a circumferential groove in the mounting bracket. In this way, the cap is secured on the mounting bracket through a simple clip attachment.

In a further embodiment of the invention, the cap-side end of the mounting housing includes, on its periphery, a coaxially protruding collar. The inner surface of the collar engages the outer groove on the cap by snapping into it. Furthermore, between the bottom of the cap and the end of the mounting housing there can be provided a free space into which extends the end region of the sun-visor shaft. The shaft is provided with an annular groove. Also extending into the free space is a spring arm formed as an integral piece of the mounting bracket. The spring arm has a free end with a detent projection which snaps into the annular groove of the sun-visor shaft. In this way, the mounting bracket serves both to support the leaf spring and to rotatably receive the sun-visor shaft. In addition, it secures the sun-visor shaft to prevent it from moving axially within the bracket.

In a different embodiment, the spring arm and its detent projection can project from the cap instead of being integral with the bracket.

A particularly advantageous embodiment of the invention provides that the cap carries an electric contact element capable of electrically contacting the free end of the sun-visor shaft. The contact element is connected to one end of an electric wire, the other end of which is routed to a source of light, such as a lamp or the like, which is arranged on the sun-visor body. The contact element can comprise a strip of sheet metal having a bent end region which is seated in an insertion opening formed in the cap. A resilient tongue of the contact element rest against the end of the sun-visor shaft. In this manner, a portion of the electric wiring for the source of light is simply realized.

The invention can also be advantageously realized by providing that the insertion opening and the mounting borehole are arranged to intersect one another in the mounting bracket. In this embodiment, the closure element is preferably a plug on which the leaf spring is supported. The plug and leaf spring are inserted together into the insertion opening. Furthermore, the plug can be formed by plastic injection molding and include a detent by which it engages and is secured to the insertion opening. The plug can include a detent projection for engaging the annular groove of the sun-visor shaft.

Optimum sealing of the mounting borehole is obtained according to the invention with the addition of a tubular body which closes the edge of the insertion opening and which extends out of the sun-visor body. The tubular body is removed, for example, by snapping it off, from the bracket before the insertion of the shaft into the mounting bracket.

Other features and advantages of the present invention will be apparent from the following description of preferred embodiments and the accompanying drawing.

BRIEF DESCRIPTION OF THE DRAWINGS

FIG. 3 is a section through the mounting bracket along the line III—III of FIG. 4.

FIG. 4 is a section along the line IV—IV of FIG. 3.

FIG. 5 is a section along the line V—V of FIG. 3.

FIG. 6 shows a portion of the mounting body in a sectional view corresponding to FIG. 3 which includes an electric contact element.

FIG. 7 is a section through the end region of the mounting bracket along the line III—III of FIG. 4 and illustrates a variation of the embodiment of FIG. 3.

FIG. 8 is a section along the line VIII—VIII of FIG. 7.

FIG. 9 shows another embodiment of the mounting bracket in sectional view along the line IX—IX of FIG. 10.

FIG. 10 is a section along the line X—X of FIG. 9.

FIG. 11 is a section through a mounting bracket similar to that of FIG. 9.

DETAILED DESCRIPTION OF THE PREFERRED EMBODIMENTS

Figure 1:
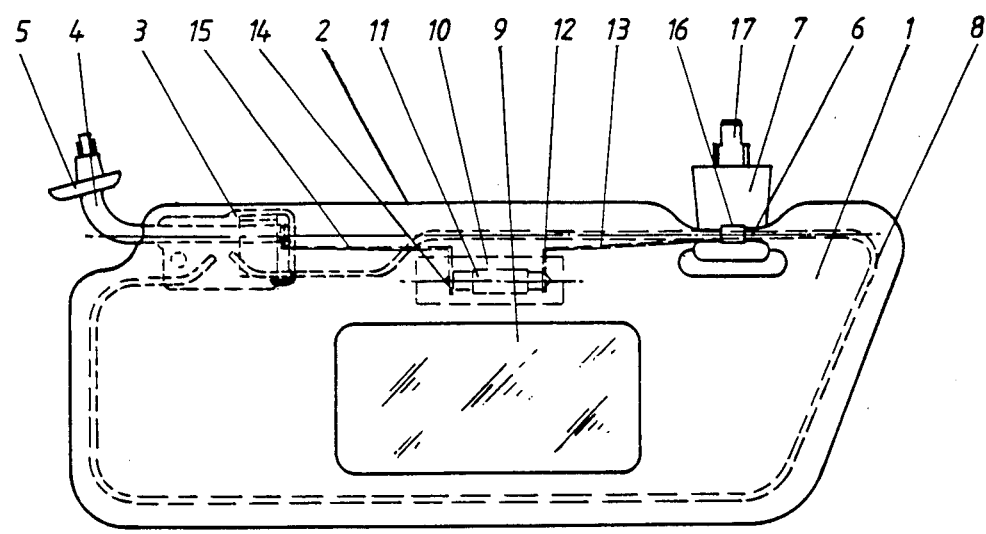
FIG. 1 is an elevational view of an assembled sun visor.

Referring to FIG. 1, the sun visor there illustrated includes a sun-visor body 1 having an upper longitudinal edge 2 with left and right end regions. On the left end region of the longitudinal edge 2, there is a swivel mount which includes a mounting bracket 3. An L-shaped sun-visor shaft 4 includes one end which is inserted in the mounting bracket 3. A mounting housing 5 receives the other short arm of the sun-visor shaft 4 and fastens the shaft 4 to the body of the vehicle (not shown).

At the right end region of the longitudinal edge 2, there is an outer support mechanism for fastening the sun visor to the vehicle. The outer support mechanism comprises an outer support pin 6 and an outer mounting bracket 7 for the pin disposed to the visor body.

Figure 2:
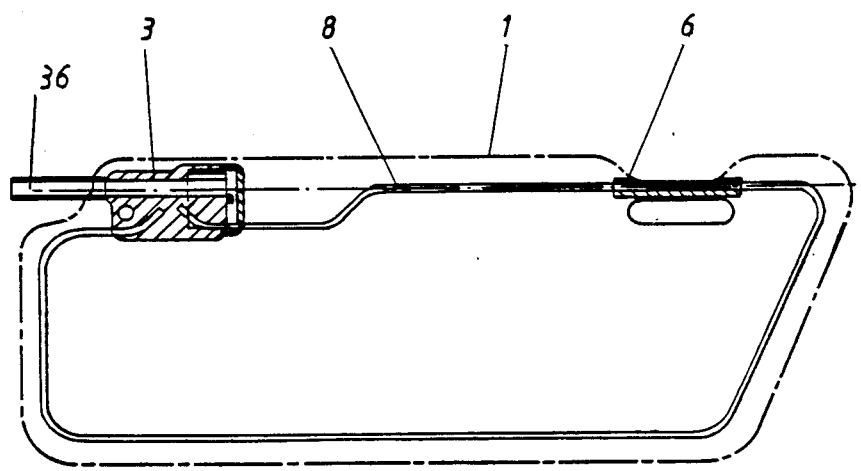
FIG. 2 shows the reinforcement insert and the mounting bracket of the sun visor of FIG. 1, with an integral extension in place.

The mounting bracket 3 is connected to a wire frame which forms a reinforcing insert 8 which stiffens the sun-visor body 1. The mounting bracket 3 can be formed by plastic injection molding, preferably directly on the wire frame (FIG. 2). On the main surface of the sun-visor body 1 which faces the passenger space of the vehicle when the sun visor is swung down is arranged a mirror 9. Adjacent to the mirror 9 is a source of light which is mounted under a light-transmitting cover 10. The source of light may comprise, for example, a tubular lamp 11, or the like.

Electric power is supplied to the tubular lamp 11 via a current lead wire 13 connected to one lamp contact 12 and a ground wire 15 connected to the other lamp contact 14. The other end of the current lead wire 13 is connected to an electric contact 16 which is mounted on the outer support shaft 6 and which contacts a corresponding contact on the outer mounting bracket 7. The single contact lug 17 of the mounting bracket 7 is adapted to be connected to an electric wire of the vehicle's electric system. The ground wire is connected to a contact element 18 which contacts the sun-visor shaft 4, as shown in detail in FIG. 6.

FIGS. 3 and 5 illustrate a first embodiment of the mounting bracket 3, and FIG. 6 illustrates a modified or improved version thereof. The mounting bracket 3 consists of a block-shaped plastic injection molding which is permanently connected to the reinforcing insert 8 by direct injection molding. The mounting bracket 3 is provided in its upper region with a continuous mounting borehole 19. The long arm of the sun-visor shaft 4 is rotatably supported in the mounting borehole 19. On the rear end 20, of the mounting bracket 3, as viewed in the direction of insertion of the sun-visor shaft 4, an insertion opening 21 is formed which is accessible only from the end 20. The insertion opening 21 serves to receive a U-shaped leaf spring 22. The insertion opening 21 which accommodates the arms of the leaf spring extends into the mounting borehole 19 so that the arms of the leaf spring may radially clamp the sun-visor shaft 4.

In the vicinity of the leaf spring 22, the sun-visor shaft 4 is guided between an upper axially extending web of material 23 and a lower axially extending web of material 24, the surfaces of which rest against the sun-visor shaft 4. The webs 23 and 24 are concavely curved to match the radius of curvature of the sun-visor shaft 4, as the cross-section illustration of the Fig. reveals. The upper web 23 serves furthermore to support the web of the leaf spring 22. The lower web of material 24 has lateral recesses 25 in its lower region. The shoulders 26 which are formed thereby serve to support, in an upright orientation, supporting arms 27 which are cut out of the arms of the leaf springs 22 and are inwardly bent.

A circumferentially protruding collar 28 is formed at the end 20 of the mounting bracket 3. A circumferential groove 29 is defined on the inside surface of the collar 28. The open side of a cup-shaped cap 30 is inserted and locked into the opening formed by the collar 28. The collar 28 and cap 30 are locked to each other via a bead 31, formed on the outside wall of the cap, which engages the groove 29. With the cap 30 the rear end of the mounting borehole 19 is covered to thereby enclose the leaf spring 22.

Into the space located between the bottom of the cap 30 and the end 20 there extends a spring arm 32 which is formed as an integral extension from the mounting bracket 3. The spring arm 32 includes a free end with a detent projection 33 developed thereon. The detent projection 33 engages the annular groove 34 defined on the end region of the sun-visor shaft 4.

To secure the leaf spring 22, one end of which rests on the bottom of the insertion opening 21, in place, there are provided detent noses 35 formed on the mounting bracket 3 which grip the spring, as shown in FIG. 5. However, it is also possible to extend the cap wall, as shown in FIG. 6, so that the cap 30 supports the leaf spring 22.

As illustrated in FIGS. 3 and 5, the mounting borehole 19 is extended by a tubular body 36 formed on the mounting bracket 3. The mounting bracket 3 is connected to the tubular body 36 by a thin, relatively weak region of material which defines a frangible zone 37 which can be broken to neatly separate the tubular body 36 from the bracket 3. The tubular body 36 serves first, as does the cap 30, to prevent the penetration of foam into the inside of the mounting bracket 3 during the foaming of the sun-visor body 1 around the mounting bracket 3 and the reinforcement insert 8. The tubular body 36 also functions as a means for holding the unit consisting of the mounting bracket 3 and reinforcement insert 8 in place in the foaming mold by merely clamping the tubular body 36. As soon as the sun-visor body 1 has been produced, the tubular body 36 is removed by breaking it off from the mounting bracket 3.

FIG. 6 shows the end region of the mounting bracket 3 with the cap 30 clipped on. The cap 30 has an insertion opening 38 which accommodates the bent end of the contact element 18. The insertion opening 38 is formed in the wall of the cap 30 and is accessible through the edge of the cap.

The contact element 18 comrpises a sheet metal strip having one end which is seated in the insertion opening 38 and an adjoining arm. A free end region of the arm which is twice bent, forms a spring tongue 39 which rests against the end of the sun-visor shaft 4. The ground wire 15 passes through an opening 40 in the bottom of the cap 30 and electrically contacts the contact element as, for instance, by a contact rivet. The contact element is not required in sun visors which do not have a lighting device.

FIGS. 7 and show the end region of the mounting bracket 3 with the cap 30 in place and with the sun-visor shaft 4 mounted within the mounting bracket 3. In contrast to the embodiment of in FIGS. 3 and 5, the spring arm 32 is formed as a single piece which is integral with the bottom of the cap 30. In this embodiment too, on the free end of the spring arm 32 a detent projection 33 appears which is used for engaging the annular groove 34 of the sun-visor shaft 4 to prevent axial movement thereof.

FIGS. 9 to 11 show a second embodiment of a mounting bracket 3. It includes the mounting borehole 19 and the insertion opening 21. The essential difference is that the mounting borehole 19 and the insertion opening 21 intersect at right angles. The insertion opening 21 in this embodiment is a chamber which is accessible through the bottom of the bracket and within which the leaf spring 22 is placed. A lateral clearance is left between the spring and the bracket, as shown in FIG. 10. The mounting borehole 19 passes through the insertion opening 21, as illustrated in FIGS. 9 and 11.

A plug 41 is placed in the downwardly extending open end region of the insertion opening 21 to serve as the closure element for covering the chamber. It is held in clip-like manner in the insertion opening 21, as shown in FIG. 10. The plug 41 carries the leaf spring 22 which can be inserted into the plug 41. It is also possible to form the plug 41 by injection molding it directly around the free end regions of the spring arms to obtain a reliable connection between the plug 41 and the leaf spring 22.

The plug 41 of FIG. 11 is integral with the spring arm 32 whose free end region includes the detent projection which engages the annular groove 34 located on the free end region of the sun-visor shaft 4 in the previously described manner.

While the mounting borehole is illustrated as a continuous hole in the embodiments described thus far, it may be permanently capped by a closed end 42 in the mounting bracket embodiments of FIGS. 9 and 11.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A sun visor for automotive vehicles, comprising:
a sun-visor body;
a mounting bracket attached to the sun-visor body, the mounting bracket defining a mounting borehole for supporting a shaft therein, the mounting borehole having a first opening through which the shaft is inserted into the borehole and a second opening into the borehole;
a spring which fits into the mounting borehole through the second opening and is located adjacent thereto, the spring having a shape and orientation within the mounting borehole which permits it to clamp the shaft within the body of the spring;
a cover for enclosing the second opening, whereby the second opening is effectively covered against entry of material through the second opening;
the second opening being axially aligned with the borehole and in which the cover is a cap which is attached to the bracket at the second opening;
the cap being cup-shaped, the sun visor further including means for securing the cap to the mounting bracket;
the securing means comprising a circumferential bead formed on the peripheral edge of the cap and a complementary circumferential groove defined in the mounting bracket adjacent the second opening, the bead snappingly engaging the groove.

2. A sun visor as in claim 1, in which the mounting bracket includes a circumferentially and axially extending collar, the groove being located on an inner surface of the collar.

3. A sun visor as in claim 1, in which the spring is a leaf spring having a pair of arms which clamp the shaft.

4. A sun visor as in claim 1, further including an electric contact element which is located against the cap and faces toward the second opening and an electrical wire which is connected to the contact element and extends out of the cap, the contact element being positioned such that it may be electrically engaged by the shaft.

5. A sun visor as in claim 4, in which the electric contact element comprises a bent metal strip having a first end which is supported in a deep groove which is defined in the wall of the cap and a resilient second end which is adapted to be contacted by the shaft.

6. A sun visor as in claim 1, further including a extension which is integral with and extends from the first opening of the mounting bracket, the integral extension protruding out of the sun-visor body, whereby the first opening is effectively covered during production of the sun visor.

7. A sun visor as in claim 1, further including a extension which is integral with and extends from the first opening of the mounting bracket, the integral extension protruding out of the sun-visor body, whereby the first opening is effectively covered during production of the sun visor.

8. A sun visor as in claim 1, in which the sun-visor body is flat and generally rectangular.

9. A sun visor for automotive vehicles, comprising:
a sun-visor body;
a mounting bracket attached to the sun-visor body, the mounting bracket defining a mounting borehole for supporting a shaft therein, the mounting borehole having a first opening through which the shaft is inserted into the borehole and a second opening into the borehole;
a spring which fits into the mounting borehole through the second opening and is located adjacent thereto, the spring having a shape and orientation within the mounting borehole which permits it to clamp the shaft within the body of the spring;
a cover for enclosing the second opening, whereby the second opening is effectively covered against entry of material through the second opening;
the second opening being axially aligned with the borehole and in which the cover is a cap which is attached to the bracket at the second opening;
the cap being cup-shaped, the sun visor further including means for securing the cap to the mounting bracket;
further including an integrally formed, resilient arm which extends from the mounting bracket into a space defined between the cap and the second opening, the arm including a projection adapted to engage a circumferential groove defined on the shaft whereby axial displacement of the shaft is prevented.

10. A sun visor for automotive vehicles, comprising:
a sun-visor body;
a mounting bracket attached to the sun-visor body, the mounting bracket defining a mounting borehole for supporting a shaft therein, the mounting borehole having a first opening through which the shaft is inserted into the borehole and a second opening into the borehole;
a spring which fits into the mounting borehole through the second opening and is located adjacent thereto, the spring having a shape and orientation within the mounting borehole which permits it to clamp the shaft within the body of the spring;
a cover for enclosing the second opening, whereby the second opening is effectively covered against entry of material through the second opening;
the second opening being axially aligned with the borehole and in which the cover is a cap which is attached to the bracket at the second opening;
the cap being cup-shaped, the sun visor further including means for securing the cap to the mounting bracket;
further including an integrally formed, resilient arm extending from an inner location on the cap into a space defined between the cap and the second opening, the arm including a projection which is adapted to engage a circumferential groove defined on the shaft whereby axial displacement of the shaft is prevented.

11. A sun visor for automotive vehicles, comprising:
a sun-visor body;
a mounting bracket attached to the sun-visor body, the mounting bracket defining a mounting borehole for supporting a shaft therein, the mounting borehole having a first opening through which the shaft is inserted into the borehole and a second opening into the borehole;
a spring which fits into the mounting borehole through the second opening and is located adjacent thereto, the spring having a shape and orientation within the mounting borehole which permits it to clamp the shaft within the body of the spring;
a cover for enclosing the second opening, whereby the second opening is effectively covered against entry of material through the second opening;
the second mounting into the mounting borehole being formed around an axis which extends generally perpendicularly to the axial direction of the mounting borehole;
the cover comprising a plug which fits in the mounting bracket through the second opening;
the spring being supported on the plug and in which the plug and the spring are insertable as a unit into the mounting borehole through the second opening.

12. A sun visor as in claim 11, in which the plug is injection molded around an edge portion of the spring, the plug having a body formed with a detent region which engages the mounting bracket.

13. A sun visor as in claim 12, further including an integrally formed projection on the plug which engages an annular groove defined on the shaft whereby axial displacement of the shaft is prevented.

14. A sun visor for automotive vehicles, comprising:
a sun-visor body;
a mounting bracket attached to the sun-visor body, the mounting bracket defining a mounting borehole for supporting a shaft therein, the mounting borehole having a first opening through which the shaft is inserted into the borehole and a second opening into the borehole;
a spring which fits into the mounting borehole through the second opening and is located adjacent thereto, the spring having a shape and orientation within the mounting borehole which permits it to clamp the shaft within the body of the spring;
a cover for enclosing the second opening, whereby the second opening is effectively covered against entry of material through the second opening;
the second opening being axially aligned with the borehole and in which the cover is a cap which is attached to the bracket at the second opening;
the cap being cup-shaped, the sun visor further including means for securing the cap to the mounting bracket;
the spring being a leaf spring having a pair of arms and wherein the mounting bracket comprises recesses located in the wall of the mounting borehole adjacent the second opening in which the arms of the leaf spring are supported;
at least a portion of the peripheral edge of the cap being shaped to extend through the second opening into the mounting borehole and to abut the leaf spring to secure it within the mounting borehole.

* * * * *